Nov. 23, 1948.  I. POLLACK  2,454,670
PORTABLE FLUORESCENT LAMP CONTROL SYSTEM
Filed July 5, 1947
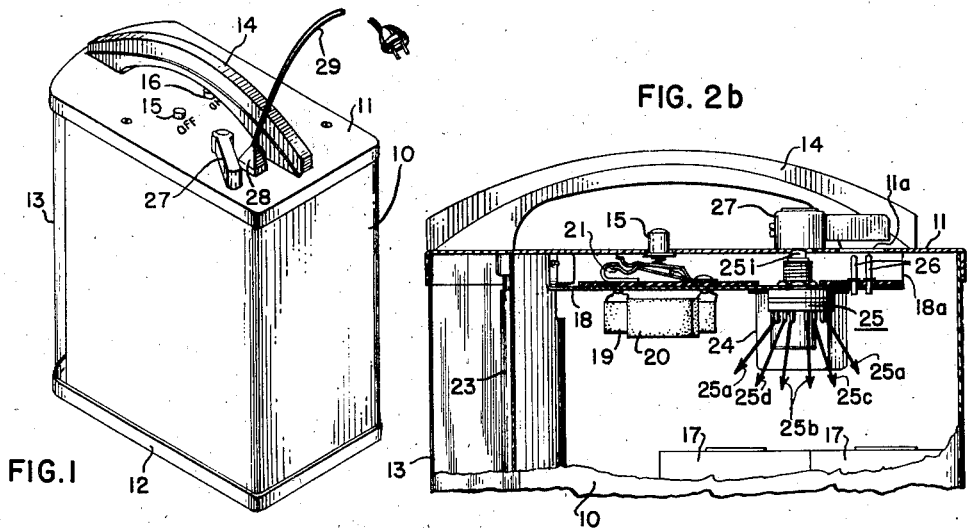
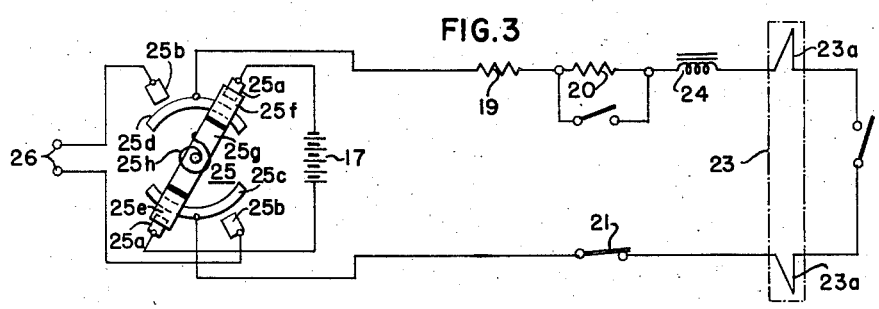
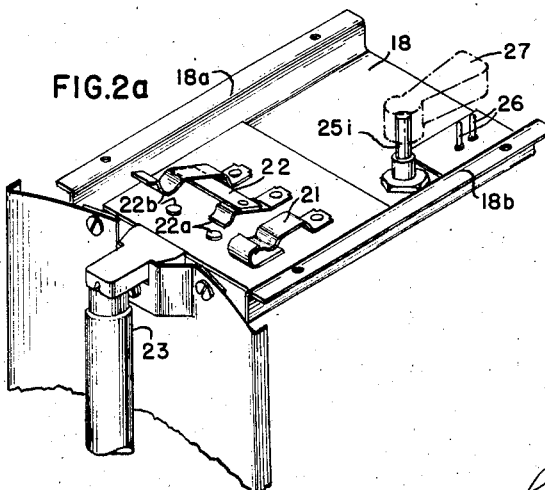
INVENTOR.
ISRAEL POLLACK
BY Laurence B. Dodds
ATTORNEY Patented Nov. 23, 1948

2,454,670

UNITED STATES PATENT OFFICE 2,454,670

PORTABLE FLUORESCENT LAMP CONTROL SYSTEM

Israel Pollack, Brooklyn, N. Y., assignor to Paramount Industries, Inc., a corporation of New York Application July 5, 1947, Serial No. 759,267

4 Claims. (Cl. 315—175)

This invention relates to portable fluorescent lamp control systems and, more particularly, to systems for controlling the energization of such lamps selectively from self-contained battery sources or from an external commercial supply circuit. In the copending application of Alfonse D. Sobel, Serial No. 668,103, filed May 8, 1946, now Patent No. 2,435,164, and assigned to the same assignee as the present application, there is described and claimed a portable fluorescent lamp provided with self-contained batteries. The present invention is an improvement on the lamp of that application which permits operation of the lamp from an external commercial supply circuit when available.

It is an object of the present invention, therefore, to provide a new and improved control system for a portable fluorescent lamp of the type described which permits operation of the lamp from a commercial supply circuit when available and thus reduces the drain on the self-contained battery and prolongs its life.

It is another object of the invention to provide a new and improved control system for fluorescent lamps of the type described, in which operation from a commercial supply circuit can be effected only when the self-contained battery is disconnected, thus precluding any possibility of short-circuiting the supply circuit through the battery.

It is another object of the invention to provide a new and improved control system for fluorescent lamps of the type described, in which the operator is not required to remember any particular switching operation in effecting a change-over from battery to supply circuit operation.

In accordance with the invention, a control system for a portable fluorescent lamp included in a housing and adapted to be energized selectively from self-contained battery means or from an external electric supply circuit comprises a unitary control panel including devices for starting the lamp, a switch having battery terminals and external supply circuit terminals and contact means movable therebetween and biased into engagement with the battery terminals. The control system also includes an external circuit fixture connected to the supply circuit terminals and exposed to the outside of the housing and an operating member for the switch normally covering the fixture but movable away therefrom to permit connection of an external line-cord fixture.

For a better understanding of the invention, together with other and further objects thereof, reference is had to the following description taken in connection with the accompanying drawing, and its scope will be pointed out in the appended claims.

Referring now to the drawing, Fig. 1 is a perspective view of a portable fluorescent lamp embodying the control system of the invention; Fig. 2a is a top perspective view of a sub-assembly of the lamp of Fig. 1; Fig. 2b is a partial cross-sectional view of the lamp of Fig. 1 showing certain details of the sub-assembly of Fig. 2a; while Fig. 3 is a circuit diagram of the control system embodied in the lamp of the preceding figures.

Referring now particularly to the drawing, the lamp may be of the same general type as that described in the aforesaid Sobel application comprising a housing 10 having an upper cap or closure 11 and lower cap or closure 12. The front of the lamp is arcuate in section and is enclosed by a curved transparent sheet 13 of glass, plastic, or the like. A suitable carrying handle 14 is provided and there are provided "off" and "on" buttons 15 and 16, respectively, protruding through the top cap 11 in the vicinity of the handle 14 for ready manipulation.

The lamp also includes a control system mounted within the housing 10 and adapted to be energized selectively from self-contained batteries 17, 17 or from an external supply circuit. This control system includes a unitary control panel 18 with up-turned longitudinal mounting flanges 18a, 18b. On the panel 18 are mounted the several devices required for starting the fluorescent lamp, such as stabilizing resistors 19, 20 and an "off" or circuit-opening switch 21 disposed immediately below the push button 15 for operation thereby and a switch 22 having normally open contacts 22a connected to short-circuit at least a portion of the resistance provided by the resistors 19 and 20, specifically to short-circuit the resistor 20, and normally open contacts 22b connected to short-circuit the fluorescent lamp element 23, that is, to connect its filaments 23a, 23a directly together in a conventional manner. The switch 22 is disposed to be actuated by the "on" push button 16. A starting inductor or choke coil 24 is also mounted on the control panel 18.

The control system of the invention also includes a rotary switch 25 illustrated in more detail diagrammatically in Fig. 3 and comprising a pair of diametrically opposed battery terminals 25a, 25a and a pair of diametrically opposed external supply circuit terminals 25b, 25b and contact means movable therebetween and biased into engagement with the battery terminals. For example, the switch 25 may include also a pair of opposed stationary arcuate contact segments 25c, 25d and a pair of bridging contacts 25e, 25f, each movable between one of the battery terminals 25a, 25a and one of the supply circuit terminals 25b, 25b and engaging one of the segments 25e, 25f. The contacts 25e, 25f are mounted on a radial arm 25g which is biased by means of a spring 25h so that the contacts 25e, 25f normally engage the contacts 25a, 25a.

The control system also includes an external circuit fixture, such as a plug connector 26, the two terminals of which are connected to the supply circuit terminals 25b, 25b of switch 25. The fixture 26 is confined within the housing, as shown in Fig. 2b, but is exposed to the outside of the housing through an aperture 11a in the top cap 11. The switch 25 is provided with an operating member or handle 27 secured to a shaft 25i protruding through the top cap 11 of the housing. The disposition of the aperture 11a with respect to the switch 25 is such that the operating handle 27 normally covers the aperture 11a and thus the fixture 26 but, upon movement of the switch handle 27 in a clockwise direction to disengage the battery terminals 25a, 25a, it exposes the aperture 11a and the fixture 26 to permit connection of a fixture or socket 28 attached to an external line cord 29.

It is believed that the operation of the control system for portable fluorescent lamps described above will be clear from the foregoing description. However, briefly, assuming the line cord 29 and socket 28 to be disconnected and the lamp to be de-energized, the switch 25 will be biased by the spring 25h into the position in which the handle 27 covers the aperture 11a and the fixture 26 and in which the switch contacts 25c, 25d, which are connected to the lamp circuit, are energized from the battery 17 through contacts 25a, 25a. If now, the switch 22 be closed momentarily by means of the button 16, the normally open contacts 22a are closed to short-circuit the resistor 20 and almost immediately thereafter the contacts 22b are closed to short-circuit the lamp bulb 23 by interconnecting its filaments 23a, 23a. This completes the circuit to the lamp and, as is well understood in the art, current builds up from the battery 17 through the resistor 19, the reactor 24, the filaments 23a, 23a in series, and the normally closed switch 21. A few seconds later when the filaments 23a, 23a are heated, release of the "on" button 16 interrupts the short circuit of the lamp 23 and immediately afterward the short circuit around resistor 20 and tends to interrupt the current in the inductor 24 but such tendency causes a high counter-electromotive force to be built up therein which initiates a discharge between the filaments 23a, 23a to illuminate the lamp. When equilibrium has been reached, the resistors 19 and 20 in series are effective to stabilize the operation of the lamp and limit the drain on the battery 17. If now, the button 15 is depressed to open the contacts 21, the circuit of the lamp is opened and the lamp remains de-energized until the "on" button 16 is operated again.

If now an external electric supply circuit is available, the line cord 29 may be connected to that circuit and the switch handle 27 rotated clockwise to permit connection of the socket 28 and the fixture 26. This clockwise rotation of the switch handle 27 operates the switch 25 to close the contacts between the lamp circuit and the external supply circuit terminals 25b, 25b. With this connection, the operation of the lamp is in all respects similar to that described above. With the provision of the control system described, it is thus seen that it is impossible to connect the lamp to an external supply circuit without first operating the switch 25 to transfer the lamp circuit from the battery terminals to the external supply terminals and thus precludes any possibility of short-circuiting the supply circuit through the battery. Furthermore, due to the arrangement described, it becomes unnecessary for the operator to have to remember to operate any switch mechanism since he cannot connect the external supply circuit without operating the switch handle, as described above.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A control system for a portable fluorescent lamp included in a housing and adapted to be energized selectively from self-contained battery means or from an external electric supply circuit, comprising: a unitary control panel including devices for starting the lamp, a switch having battery terminals and external supply circuit terminals and contact means movable therebetween and biased into engagement with said battery terminals, and an external circuit fixture connected to said supply circuit terminals and exposed to the outside of said housing; and an operating member for said switch normally covering said fixture but movable away therefrom to permit connection of an external line-cord fixture.

2. A control system for a portable fluorescent lamp included in a housing and adapted to be energized selectively from self-contained battery means or from an external electric supply circuit, comprising: a unitary control panel including a stabilizing resistance means, an on-off switch including contacts for short-circuiting at least a portion of said resistance means, a starting inductor, a switch having battery terminals and external supply circuit terminals and contact means movable therebetween and biased into engagement with said battery terminals, and an external circuit fixture connected to said supply circuit terminals and exposed to the outside of said housing; and an operating member for said switch normally covering said fixture but movable away therefrom to permit connection of an external line-cord fixture.

3. A control system for a portable fluorescent lamp included in a housing and adapted to be energized selectively from self-contained battery means or from an external electric supply circuit, comprising: a unitary control panel including devices for starting the lamp, a rotary switch having a pair of diametrically opposed battery terminals and a pair of diametrically opposed external supply circuit terminals, a pair of stationary contact segments and a pair of bridging contact elements each movable between one of said battery terminals and one of said supply circuit terminals and engaging one of said segments and biased into engagement with said battery terminals, and an external circuit fixture connected to said supply circuit terminals and exposed to the outside of said housing; and an operating member for said switch normally covering said fixture but movable away therefrom to permit connection of an external line-cord fixture.

4. A control system for a portable fluorescent lamp included in a housing and adapted to be energized selectively from self-contained battery means or from an external electric supply circuit, comprising: a unitary control panel including devices for starting the lamp, a switch having battery terminals and external supply circuit terminals and contact means movable therebetween and biased into engagement with said battery terminals, and an external circuit plug connector connected to said supply circuit terminals, confined within said housing and exposed to the outside of said housing; and an operating member for said switch normally covering said plug connector but movable away therefrom to permit connection of an external line-cord socket.

ISRAEL POLLACK.

REFERENCES CITED

The following references are of record in the file of this patent:

UNITED STATES PATENTS

| Number | Name | Date |
|---|---|---|
| 1,904,935 | Scott | Apr. 18, 1933 |
| 2,358,796 | Edgerton | Sept. 26, 1944 |
| 2,413,599 | Beck | Dec. 31, 1946 |